UNITED STATES PATENT OFFICE.

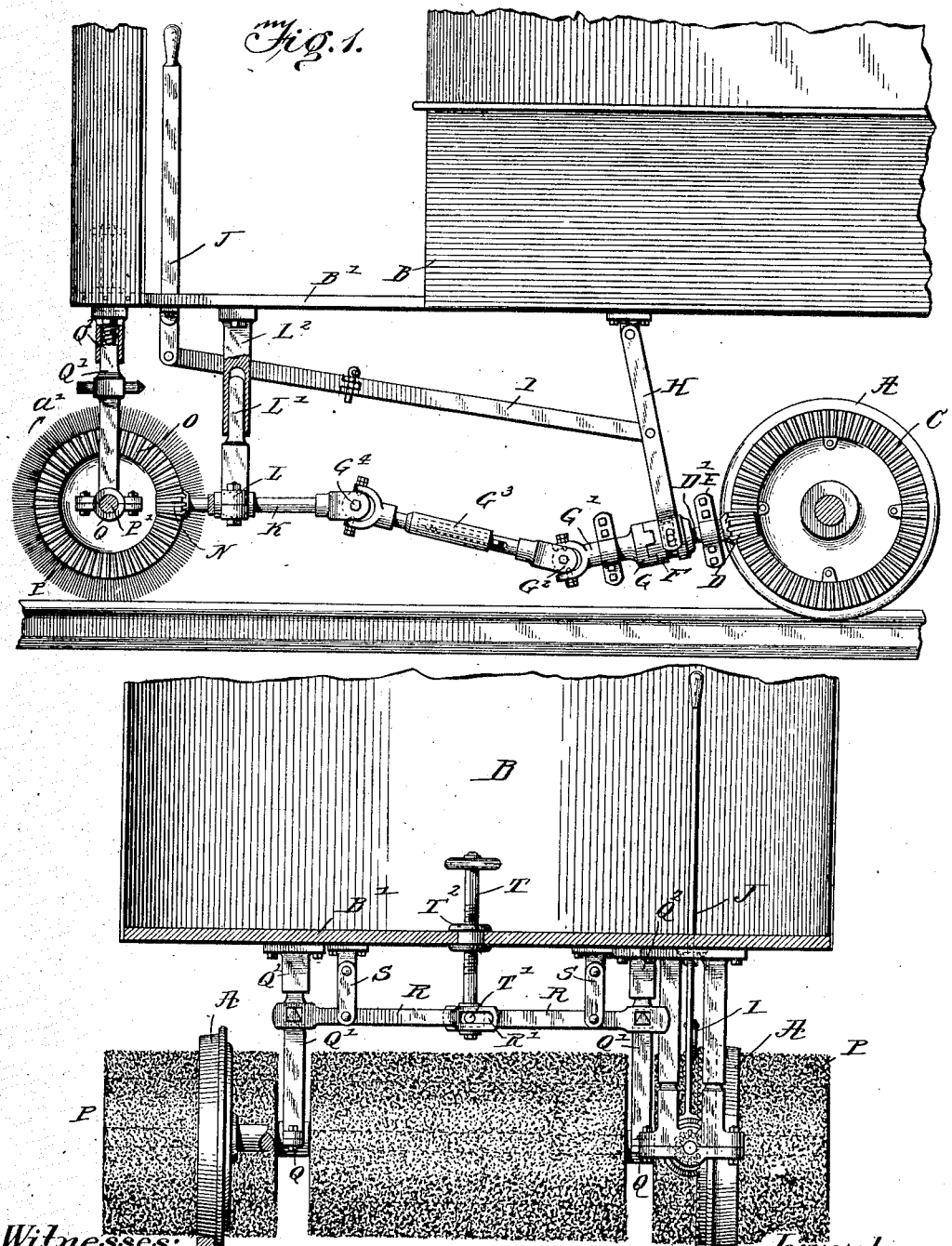

JOHN DOBOS, OF NEW YORK, N. Y.

CAR-FENDER AND TRACK-CLEANER.

No. 860,358.　　　Specification of Letters Patent.　　　Patented July 16, 1907.

Application filed February 20, 1907. Serial No. 358,519.

*To all whom it may concern:*

Be it known that I, JOHN DOBOS, a subject of the Emperor of Austria, and a resident of the city of New York, borough of Manhattan, in the county and State of New York, have invented a new and Improved Car-Fender and Track-Cleaner, of which the following is a full, clear, and exact description.

The object of the invention is to provide a new and improved car fender and track cleaner for use on street cars, automobiles and other vehicles, and arranged to allow convenient and quick adjustment of the fender relative to the roadway or track rails, and to permit the person in charge of the vehicle to quickly throw the fender or cleaner into an active position or to move the fender into an inactive position.

The invention consists of novel features and parts and combinations of the same, which will be more fully described hereinafter and then pointed out in the claims.

A practical embodiment of the invention is represented in the accompanying drawings forming a part of this specification, in which similar characters of reference indicate corresponding parts in both views.

Figure 1 is a sectional side elevation of the improvement as applied to a street car, and Fig. 2 is an end elevation of the same, parts being in section.

To one of the car wheels A at each end of the car B is secured a bevel gear wheel C in mesh with a pinion D having its shaft D' journaled in a suitable bearing arranged on a bracket E attached to the car truck or to the casing of the motor for driving the car. On the shaft D' is mounted to slide and to turn with the shaft D' a clutch member F adapted to engage a clutch member G secured to or formed on a shaft G', mounted to turn in a bearing on the bracket E. The movable clutch member F is engaged by a shifting lever H fulcrumed on the under side of the car B and connected by a link I with a hand lever J extending in front of the motor man standing on the platform B' of the car B, so that the motor man on shifting the lever J can impart a swinging motion to the lever H, to move the clutch member F in or out of engagement with the clutch member G. When the clutch member F is in engagement with the clutch member G and the car travels, then a rotary motion is transmitted by the bevel gear wheel C to the pinion D, which, by its shaft D' and the clutch members F and G, rotates the shaft G'. By moving the lever J in an opposite direction, the clutch member F can be moved out of engagement with the clutch member G, so that the shaft G' remains at a standstill when the car travels.

The shaft G' is connected by a universal joint $G^2$ with an extension link $G^3$ connected by a universal joint $G^4$ with a shaft K, journaled in a bearing L having a standard L' mounted to slide vertically in a bearing $L^2$ attached to the under side of the platform B' of the car B. The forward end of the shaft K is provided with a bevel pinion N in mesh with a bevel gear wheel O secured on a brush P extending across the track at the end of the car, the brush being preferably arranged obliquely, that is, at an angle of about ten degrees relative to the track rails or the direction in which the car is traveling.

As shown in Fig. 2 the brush P is made in three sections, and a shaft P' is journaled between the sections in bearings Q having standards Q' mounted to slide vertically in bearings $Q^2$ attached to the under side of the car platform B'. The standards Q' above the brush P are connected with levers R fulcrumed on links S held on the under side of the car platform B', and the adjacent ends of the levers R are provided with elongated slots R', into which projects a pin T' held loosely on the lower end of a screw rod T screwing in a nut $T^2$ attached to the car platform B'. The pivotal connection between the levers R and the standards Q' is by the use of centers, as plainly indicated in Fig. 2, so that when the operator screws the screw rod T downward in the nut $T^2$, then a swinging motion is given to the levers R to raise the standards Q' and consequently the brush P, and when the screw rod T is screwed upward then a reverse swinging motion is given to the levers R, to move the standards Q' and the brush P downward. Thus from the foregoing it will be seen that by the operator simply turning the screw rod T in either a down or up direction, the brush P can be properly raised or lowered, to move the brush in proper relation to the track or roadway.

By having the driving connection between the car wheel A and the brush P, as described, it is evident that a proper driving of the brush from the car wheel A takes place at all times and irrespective of inequalities in the position of the car B relative to the truck when the vehicle travels around curves or when the car body has more or less of a load; in other words, the connection between the car wheel A and the brush P is capable of flexing in any direction to insure at all times a proper driving of the brush P from the car wheel A, the brush P rotating in the direction of the arrow a'.

The link I, previously mentioned, is preferably made in sections, connected with each other by a vertical pivot, as indicated in Fig. 1, so as to compensate for the angular position the car body takes relative to the truck when going around a curve.

The fender shown and described is comparatively simple and durable in construction, and is arranged to prevent persons from being drawn under the car, as the revolving of the brush in the direction indicated tends to lift a person in front of the car at the dash-board. It will also be seen that the device can be readily used for keeping the track clean of snow or other obstructions, and the device is very serviceable for use on street cars, automobiles and other vehicles.

Having thus described my invention, I claim as new and desire to secure by Letters Patent:

1. A car fender and track cleaner comprising a revoluble brush, driving means for rotating the said brush from one of the car wheels, manually controlled means for throwing the said driving means in or out of gear and manually controlled means for raising and lowering the brush.

2. A car fender and track cleaner comprising a revoluble brush, bearings for the shaft of the said brush and having standards, levers fulcrumed on the car and pivotally connected with the said standards, and manually controlled means for imparting a swinging motion to the said levers to adjust the said brush relative to the car rails.

3. A car fender and track cleaner comprising a revoluble brush, bearings for the shaft of the said brush and having standards, levers fulcrumed on the car and pivotally connected with the said standards, manually controlled means for imparting a swinging motion to the said levers to adjust the said brush relative to the track rails, and bearings on the car for the upper ends of the said standards to slide in.

4. A car fender and track cleaner comprising a revoluble brush, bearings for the shaft of the said brush and having standards, levers fulcrumed on the car and pivotally connected with the said standards, manually controlled means for imparting a swinging motion to the said levers to adjust the said brush relative to the track rails, and a driving gear for the said brush connected with one of the car wheels, to rotate the brush from the said car wheel.

5. A car fender and track cleaner comprising a revoluble brush, bearings for the shaft of the said brush and having standards, levers fulcrumed on the car and pivotally connected with the said standards, manually controlled means for imparting a swinging motion to the said levers to adjust the said brush relative to the track rails, a driving gear for the said brush connected with one of the car wheels, to rotate the brush from the said car wheel, the said driving gear comprising a beveled gear wheel on the brush, a pinion in mesh with said bevel gear wheel, a shaft carrying the pinion, a link having a universal joint connection with the said pinion shaft, a clutch shaft having a universal joint connection with the said link, a bevel gear wheel on the car wheel, a pinion in mesh with the said gear wheel on the car wheel, a shaft carrying the said pinion, and a clutch having one member fixed on the said clutch shaft and the other member being movable and mounted to slide on and to turn with the said last-named pinion shaft.

6. A car fender and track cleaner comprising a revoluble brush, bearings for the shaft of the said brush and having standards, levers fulcrumed on the car and pivotally connected with the said standards, manually controlled means for imparting a swinging motion to the said levers to adjust the said brush relative to the track rails, a driving gear for the said brush connected with one of the car wheels, to rotate the brush from the said car wheel, the said driving gear comprising a beveled gear wheel on the brush, a pinion in mesh with the said bevel gear wheel, a shaft engaging the pinion, a link having a universal joint connection with the said pinion shaft, a clutch shaft having a universal joint connection with the said link, a bevel gear wheel on the car wheel, a pinion in mesh with the said gear wheel on the car wheel, a shaft engaging the said pinion, a clutch having one member fixed on the said clutch shaft and the other member being movable and mounted to slide on and to turn with the said last-named pinion shaft, and means under the control of the motorman for shifting the said movable clutch member.

7. A car fender and track cleaner provided with a revoluble brush supported from the end of the car, and a driving gear for driving the said brush from one of the rotating parts of the car, the said driving gear being flexible in every direction.

8. A car fender and track cleaner provided with a revoluble brush supported from the end of the car, a driving gear for driving the said brush from one of the rotating parts of the car, the said driving gear being flexible in every direction, and means for raising and lowering the brush.

JOHN DOBOS.

Witnesses:
JOSEPH ROTH,
CONSTANTIN NEGOCSEN.